United States Patent [19]

Anthony

[11] Patent Number: 4,692,137

[45] Date of Patent: Sep. 8, 1987

[54] SPLIT TUBE CENTRIFUGE ROTOR ADAPTER

[75] Inventor: Linda J. Anthony, Mountain View, Calif.

[73] Assignee: Beckman Instruments, Inc., Fullerton, Calif.

[21] Appl. No.: 719,179

[22] Filed: Apr. 3, 1985

[51] Int. Cl.[4] .............. B01D 00/00

[52] U.S. Cl. .............. 494/85; 422/72; 422/104

[58] Field of Search .............. 494/16, 20, 17, 21, 494/45, 85; 422/72, 102

[56] References Cited

U.S. PATENT DOCUMENTS

| | | | |
|---|---|---|---|
| 3,674,197 | 7/1972 | Mitchell | 494/21 |
| 3,761,408 | 9/1973 | Yoon | 494/21 |
| 3,998,383 | 12/1976 | Romanauskas | 494/16 |
| 4,451,250 | 5/1984 | Romanauskas | 494/85 |

*Primary Examiner*—Robert W. Jenkins

*Attorney, Agent, or Firm*—W. H. May; P. R. Harder

[57] ABSTRACT

A centrifuge adapter is formed in two sections divided by a plane that preferably extends through the longitudinal axis of the adapter. The two sections may be substantially identical in a first embodiment, each including a generally semicylindrical portion having a trough therein and further including an end portion. In a second embodiment, the adapter may comprise a first section including the entire bottom end portion for supporting the bottom of a centrifuge tube. The second section is formed generally as a semicylinder. When the first and second portions are assembled in facing relationship the troughs form a cavity for receiving a centrifuge tube therein. The sections of the adapter may be separate pieces, or they may hingedly connected along a pair of adajcent edges. The sections may be connected by projections extending from one section into corresponding cavities in the other section. The sections are easily separated after the sample has been centrifuged to remove the centrifuge sample tube from the adapter.

10 Claims, 7 Drawing Figures

FIG. 1
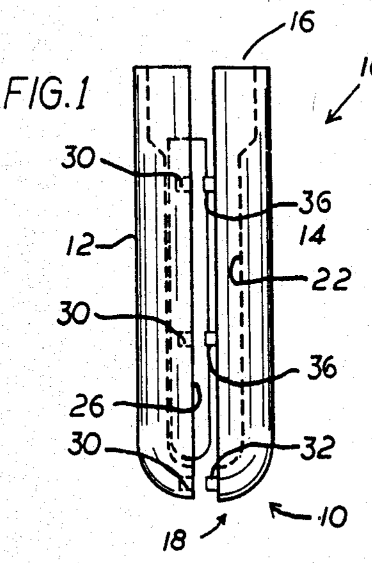
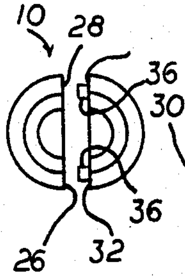
FIG. 2
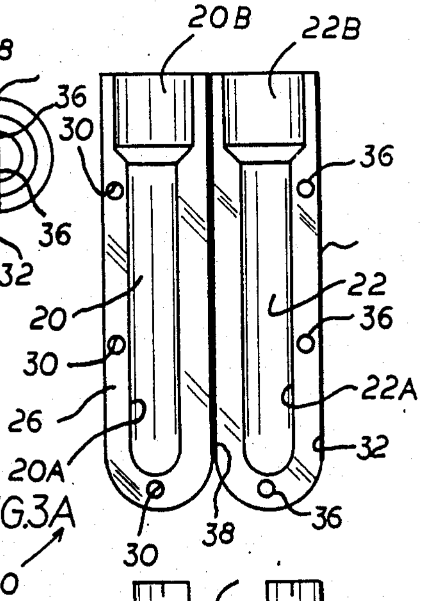
FIG. 3A
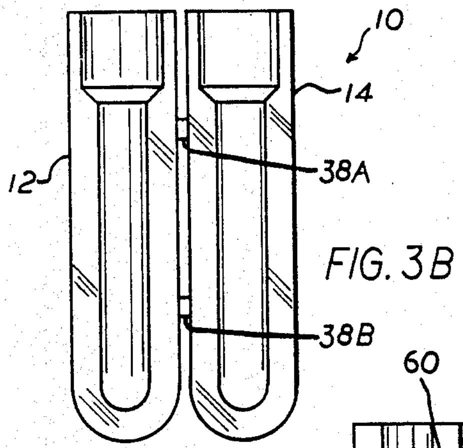
FIG. 3B
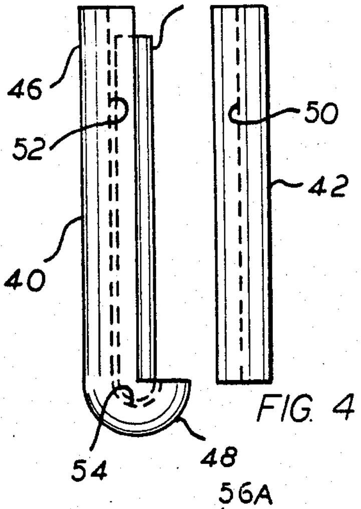
FIG. 4
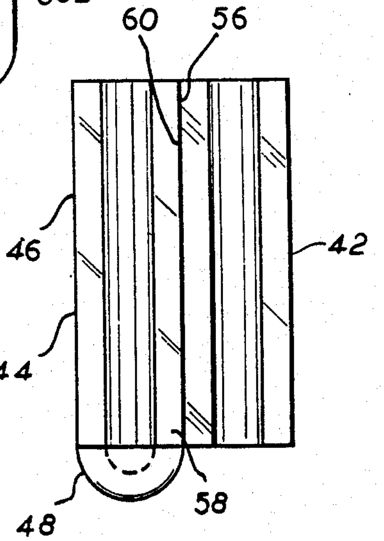
FIG. 5A
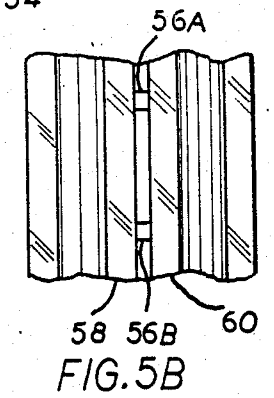
FIG. 5B

SPLIT TUBE CENTRIFUGE ROTOR ADAPTER

BACKGROUND OF THE INVENTION

This invention relates generally to centrifuges and generally to apparatus and methods for placing tubes in centrifuge rotors. Still more particularly, this invention relates to apparatus and methods for holding a small tube in a bucket in a centrifuge rotor that was originally designed to accommodate tubes having larger diameters.

In chemical laboratory procedures it is often desirable to use small diameter tubes to hold a sample for exposure to the effects of a centrifugal force field. Centrifuges rotors are commonly made to hold a tube having a larger diameter than the small tubes that are sometimes used to hold the sample. It is common practice to insert the small tube in an adapter formed of a polymeric substance. Such adapters are ordinarily formed as a unitary piece of the polymeric substance shaped as hollow tubes having an outer diameter dimensioned to fit suitably within the centrifuge bucket and having an inner diameter dimensioned to receive the small tube. The function of the adapter is to fill the space in the bucket around the smaller tube.

U.S. Pat. No. 3,050,239 to Williams discloses an adapter for carrying microtubes while they are centrifuged in a peripherally slotted rotor. The adapter disclosed by Williams is a substantially planar member having an array of apertures therein. a microtube may be inserted into each aperture. The adapters are slidably receivable within slots arcuately spaced about the periphery of the rotor.

Microtubes may also be centrifuged while carried by the buckets of a swinging bucket-type centrifuge rotor. In such rotors each bucket is pivotally mounted between trunion pins carried on angularly spaced adjacent arms that emanate for the rotor hub. A typical adapter for swinging bucket rotors is sold by E. I. Du Pont Nemours and Company, Inc. under the trademark "Sorval". various other adapters are disclosed in U.S. Pat. No. 4,451,250 to Romanauskas, U.S. Pat. No. 3,998,383 to Romanauskas et al., U.S. Pat. No. 3,027,799 to Weichselbaum, and U.S. Pat. No. 4,484,907 to Sheeran, Jr.

Since the adapter is usually made of a different material than the tube, the behavior of the adapter under centrifugal load differs from that of the tube. In most cases the tube plastically deforms as it expands to fill the interior of the adapter. When the centrifugal load is removed from the tube, the tube must be extracted from the adapter for subsequent chemical processes to be performed on the sample.

However, because of the plastic deformation of the tube within the adapter, it is often extremity difficult to remove the tube from the adapter. It is common practice for laboratory personnel to manually extract centrifuge tubes from adapters by grasping the upper end of the tubes with a hemostat or other similar device. Prior adapters require that the length of the centrifuge tube exceed the length of the portion of the adapter that closely fits upon the body of the tube. Therefore, the adapters and centrifuge tubes must be selected so that it is possible to grasp the open end of the tube to remove the tube from the adapter. Difficulties in removing the small tube from the adapter are time consuming and often have deleterious effects on the density gradient of the layers in the centrifuged sample.

SUMMARY OF THE INVENTION

The present invention provides a centrifuge adapter that overcomes the difficulties of prior adapters by providing an adapter that is convenient to use for placing small tubes in centrifuge rotor buckets designed for larger diameter tubes and that provides ease of removal of the small tubes after centrifuging. The present invention provides an adapter for use centrifuge rotor buckets and in fixed angle rotor bores.

The present invention comprises a centrifuge adapter formed in two sections divided by a plane that preferably extends through the longitudinal axis of the adapter. The sections each include a longitudinal trough such that when the two sections are juxtaposed in facing relationship, the troughs cooperate to form a cavity in the adapter for receiving a centrifuge tube. The two sections may be substantially identical with the dividing plane extending the full length of the adapter. The sections may be formed such that a first section includes the entire bottom portion of the adapter for supporting the bottom of a centrifuge tube. A second section is formed generally as a portion of a cylinder.

The adapter is used by placing a centrifuge sample tube in the cavity formed by the troughs and then placing the adapter and centrifuge sample tube in a centrifuge bucket. After centrifuging, the adapter is easily removable from the bucket; and the sections separate to provide access to the centrifuge tube. A person may easily manually remove the centrifuge sample tube from the separated sections without the use of a hemostat or other tool.

The sections of the adapter may be separate pieces, or they may hingedly connected along adjacent edges. The hinged connection may comprise a single hinge or by one or more discrete hinges. The adapter sections may also have mating projections and voids that closely fit together for assembling the sections together to form the adapter. The sections may be easily separated after centrifuging to remove the centrifuge sample tube therefrom.

The adapter sections may be formed by any convenient means, such as molding or extruding to have a desired outer diameter to fit within a bucket of a centrifuge rotor and to have a central longitudinal void having a diameter selected to accommodate a centrifuge tube.

BRIEF DESCRIPTION OF THE DRAWINGS

FIG. 1 is an elevation view of a first embodiment of a centrifuge tube adapter according to the invention formed as two substantially identical sections;

FIG. 2 is a top plan view of the centrifuge adapter of FIG. 1.

FIG. 3A is a fragmentary elevation view of the centrifuge adapter of FIGS. 1 and 2 showing first means for hingedly connecting the two sections along their length;

FIG. 3B is a fragmentary elevation view of the centrifuge adapter of FIGS. 1 and 2 showing second means for hingedly connecting the two sections FIG. 4 is an elevation view of a second embodiment of a centrifuge tube adapter formed in two sections according to the invention;

FIG. 5A is a fragmentary elevation view showing the two sections of FIG. 5 hingedly connected; and FIG. 5B is a fragmentary elevation view showing a second arrangement for hinging the two sections along adjacent edges.

DESCRIPTION OF THE PREFERRED EMBODIMENT

Referring to FIGS. 1 and 2, a centrifuge adapter 10 is formed as a pair of sections 12 and 14. When the two sections 12 and 14 are juxtaposed in facing relationship to hold a centrifuge tube 15 the centrifuge adapter 10 is formed generally as an elongate cylindrical body having an open end 16 and a closed end 18 formed generally as a hemisphere. The section 12 includes a longitudinal trough 20 therein, and the section 14 includes a corresponding trough 22. When the two sections 12 and 14 are assembled to form the centrifuge adapter 10, the two longitudinal troughs cooperate to form a generally cylindrical void 24, best shown in FIG. 2, for receiving the centrifuge sample tube 15 therein.

The trough 20 has a relatively long portion 20A that extends to a point near the closed end of the adapter 10 and also may have a widened portion 20B adjacent the open end 16 of the adapter. The portion 20A cooperates with a similar portion 22A in the trough 22 to fit closely about the centrifuge tube 15 to prevent undesired motion thereof during centrifuge operations. The portion 20B cooperates with a portion 22B that may be included in the trough 22. The widened portions 20B and 22B facilitate manual access to the upper end of the centrifuge tube 15 to facilitate its removal from one of the adapter sections 12 or 14 if the tube 15 should remain in one of the sections 12, 14 after they have been separated.

As shown in FIGS. 1, 2, 3A and 3B, the sections 12 and 14 may be substantially identical separate pieces. In order to support the centrifuge sample tube 15 within a centrifuge rotor bucket, the outer diameter of the centrifuge adapter is preferably only slightly less than the diameter of the rotor bucket so that placing the adapter 10 within the bucket maintains the relative positions of the two sections sufficiently to support the centrifuge tube.

As shown in FIG. 1, the section 12 may include a pair of surfaces 26 and 28 including a plurality of recesses 30 formed therein. The section 14 may include a pair of surfaces 32 and 34 having plurality of projections 36 corresponding to the recesses 30 and formed to snap fit therein. Each of the sections 12, 14 may also include both projections 36 and recesses 30.

Referring to FIG. 3A, the two sections 12 and 14 may be joined along a pair of edges 26 and 32, respectively by a hinge 38 that is preferably formed of the same polymeric material as the sections 12 and 14. The thickness of the polymeric material is reduced in the region of the hinge 38 to provide flexibility sufficient to permit easy hinging action for inserting and removing the centrifuge sample tube 15 from the adapter 10. The hinge 38 may be continuous and extend substantially the entire length of the sections 12 and 14, or the hinge 38 may comprise a plurality of hinges 38A, 38B etc as shown in FIG. 3B. In FIG. 3B the distance between the sections 12 and 14 is shown in exagerrated proportion in relation to the dimensions of the sections 12, 14 for clarity of illustration. In the embodiment of the adapter 10 having either of the hinge configurations of FIG. 3A or FIG. 3B, only the edge 28 has recesses 30, and only the edge 34 includes the projections 36.

Referring to FIGS. 4, 5A and 5B, a centrifuge adapter 40 includes a first section 42 and a second section 44. The section 42 is formed generally as a portion of a hollow cylinder. The section 44 includes an upper portion 46 that is substantially identical to the section 42 and a lower portion 48 that exterior to the section 44 is substantially a hemisphere. The section 42 includes a longitudinal cavity 50, and the upper portion of the section 44 includes a corresponding cavity 52. The two cavities 50 and 52 together comprise a cylindrical cavity for receiving a centrifuge tube. The lower portion 48 of the section 44 includes a generally hemispherical cavity 54 for receiving and supporting the closed rounded end of a typical centrifuge tube. The edge of the lower section 48 acts as a shelf to support the section 44 when the centrifuge adapter 40 is in use.

The centrifuge adapter 40, having a lower end formed of a single piece, affords greater support to the bottom of the centrifuge tube than does the adapter 10. Under the influence of a hight centrifugal force field, the bottom of the centrifuge adapter 10 may tend to separate slightly. Therefore, the adapter 40 is generally preferred when it is necessary to provide maximum support to the bottom of the centrifuge tube.

The two sections 42 and 44 of the centrifuge adapter 40 may be separate, or they may be joined by a hinge 56 at a pair of adjacent edges 58, 60. Like the hinge 38, the hinge 56 may be a single continuous hinge, or it may comprise a plurality of separate hinges 56A, 56B etc.

The adapter sections 12, 14, 42 and 44 may be formed by any convenient means, such as molding or extruding to have a desired outer diameter to fit within a centrifuge rotor bucket of predetermined dimensions and to have a central longitudinal void having a diameter selected to accommodate a centrifuge tube. The present invention provides an adapter for use centrifuge rotor buckets and in fixed angle rotor bores. When the adapter is used with a fixed angle rotor bore, it is ordinarily necessary to place a suitable sealing device, such as a cap (not shown) over the open end of the tube to prevent spillage of substances therefrom.

Although the present invention has been described and shown with reference to specific preferred embodiments, it is to be understood that modifications may be made to these specific embodiments without departing from the scope of the invention as defined in the appended claims.

What is claimed is:

1. An adapter for retaining a centrifuge sample tube in a generally cylindrical bucket of a centrifuge having a larger diameter than the centrifuge sample tube, comprising:

a first adapter section having a first portion formed generally as a semicylinder with a first longitudinal trough formed in a planar face of said semicylinder and a second portion formed generally as one fourth of a sphere with a cavity therein, said cavity being contiguous with said first trough for receiving a closed end of a centrifuge tube; and a second adapter section having a second longitudinal trough therein, said first and second adapter sections and said first and second longitudinal troughs being configured such that said first and second longitudinal troughs cooperate to form an enclosed void when said first and second adapter sections are juxtaposed in facing relationship, said void having predetermined dimensions for receiving a centrifuge tube therein, said first and second sections having outer surfaces cooperating to form a generally cylindrical structure for fitting within a centrifuge rotor bucket comprising a generally cylindrical cavity.

2. The adapter of claim 1 further including hinge means for connecting a first edge of said first adapter section with a second edge of said second adapter section.

3. The adapter of claim 2 further comprising a projection extending from a first surface of said first adapter section, said second adapter section including a second surface having a void therein corresponding to said projection such that said projection closely fits into said void when said first and second adapter sections are juxtaposed in facing relationship.

4. The adapter of claim 1 wherein said first adapter section includes a first surface having a projection extending therefrom and said second adapter section includes a second surface having a void therein, said void being positioned such that said projection closely fits within said void when said first and second adapter sections are juxtaposed in facing relationship.

5. The adapter of claim 4 wherein said first surface includes a plurality of projections extending therefrom and said second surface includes a plurality of corresponding voids for receiving said projections in close fitting relationship.

6. The adapter of claim 1 wherein said second adapter section is formed generally as a semicylinder substantially identical to said first portion of said first adapter section.

7. The adapter of claim 6 including hinge means for connecting a first edge of said first adapter section with a second edge of said second adapter section.

8. The adapter of claim 7 further comprising a projection extending from a first surface of said first adapter section, said second adapter section including a second surface having a void therein corresponding to said projection such that said projection closely fits into said void when said first and second adapter sections are juxtaposed in facing relationship.

9. The adapter of claim 8 wherein said first surface includes a plurality of projections extending therefrom and said second surface includes a plurality of corresponding voids for receiving said projections in close fitting relationship.

10. The adapter of claim 1, wherein the enclosed void, formed by said first and second longitudinal troughs, has predetermined dimensions such that a widened portion adjacent the open end of the adapter is formed, which widened portion facilitates manual access to the upper end of said sample tube for ease of removal of said tube from said adapter.

* * * * *